(12) United States Patent
Mitchell

(10) Patent No.: US 9,962,791 B2
(45) Date of Patent: May 8, 2018

(54) METHOD AND APPARATUS FOR LASER PROCESSING A COMPLEX PATTERN ON A CONTINUOUS ROLL

(71) Applicant: Preco, Inc., Somerset, WI (US)

(72) Inventor: Kevin Mitchell, New Richmond, WI (US)

(73) Assignee: PRECO, INC., Somerset, WI (US)

( * ) Notice: Subject to any disclaimer, the term of this patent is extended or adjusted under 35 U.S.C. 154(b) by 385 days.

(21) Appl. No.: 14/616,257

(22) Filed: Feb. 6, 2015

(65) Prior Publication Data
US 2015/0217407 A1    Aug. 6, 2015

Related U.S. Application Data

(60) Provisional application No. 61/936,703, filed on Feb. 6, 2014.

(51) Int. Cl.
| | |
|---|---|
| *B23K 26/38* | (2014.01) |
| *B23K 26/16* | (2006.01) |
| *B23K 26/08* | (2014.01) |

(52) U.S. Cl.
CPC .......... *B23K 26/38* (2013.01); *B23K 26/0846* (2013.01); *B23K 26/0876* (2013.01)

(58) Field of Classification Search
CPC .......................... B23K 26/38; B23K 26/0876; B23K 26/0846
USPC ........... 219/121.72, 71, 73, 77, 78, 79, 8, 82
See application file for complete search history.

(56) References Cited

U.S. PATENT DOCUMENTS

| | | | | |
|---|---|---|---|---|
| 4,659,587 A | * | 4/1987 | Imura | H05K 3/185 427/554 |
| 2007/0170162 A1 | * | 7/2007 | Haupt | B23K 26/064 219/121.72 |
| 2011/0053476 A1 | * | 3/2011 | Beyer | B24D 11/008 451/539 |
| 2011/0073576 A1 | * | 3/2011 | Bucklew | B23K 26/0846 219/121.72 |
| 2011/0266264 A1 | * | 11/2011 | Rumsby | B23K 26/06 219/121.72 |
| 2013/0098876 A1 | * | 4/2013 | Kobayashi | B23K 26/14 219/68 |

OTHER PUBLICATIONS

Extended Search Report issued for corresponding European Patent Application No. 15154116.6, dated Aug. 19, 2015.

* cited by examiner

*Primary Examiner* — Dana Ross
*Assistant Examiner* — Kuangyue Chen
(74) *Attorney, Agent, or Firm* — Westman, Champlin & Koehler, P.A.; Z. Peter Sawicki; Amanda M. Prose

(57) ABSTRACT

A system and method for laser processing a complex pattern and a perimeter around the complex pattern on a moving web, the complex pattern and the perimeter processed continuously with a single laser. The complex pattern may be a plurality of holes such that cutting of the perimeter forms a disk having multiple holes. The plurality of holes are interior to the disk and laser processed using a camming program while a web of material is continuously moving. The laser is then repositioned to cut the perimeter while the laser remains on and the web is continuously moved. The multi-hole disk may be cut from a continuous roll of abrasive material.

16 Claims, 5 Drawing Sheets

METHOD AND APPARATUS FOR LASER PROCESSING A COMPLEX PATTERN ON A CONTINUOUS ROLL

BACKGROUND OF THE INVENTION

The use of lasers for scoring, forming lines of weakness or grooving, and cutting thin film plastics and other materials, including fabrics and the like, has been known for some time. Generally, the laser beam is focused to cause local vaporization or degradation of the material as the material and/or the laser is/are moved relative to one another.

Two-mirror systems, or galvos, are generally incorporated into a laser system for directing or redirecting the laser beam in a predetermined pattern to process a substrate. In laser processing of a substrate, the program used to control the galvo and to direct the laser is generally referred to as "camming."

Prior art methods for laser processing parts on a moving roll require a different tooling plate for each individual part processed. The tooling plate provides the material support and allows chads and other interior part features to be pulled from the web. The requirement of a tooling plate increases capital expense as well as changeover time. Along with this, the tooling plates need to be cleaned frequently, increasing machine downtime.

Laser processing can be used to form or cut holes in a substrate. The laser spot can be fixed with regard to the substrate to remove an area and form a hole or, a trepanning mode can be used wherein the laser is guided in a circle, so that a disc is cut out of the substrate. In prior art laser systems, complex parts are processed using a "step and repeat" method where a part nesting is processed within the field of view of the laser while the web is stationary, the web is then indexed forward and the next part nesting is processed. The prior art process requires the web to be stationary in order to be processed such that laser on time during processing is generally 50% or less, depending on part complexity and indexing speeds.

SUMMARY OF THE INVENTION

The present disclosure is directed to a laser processing system for cutting multi-hole disks in a material, wherein a laser is programmed to cut an interior hole and to cut a perimeter of the multi-hole disk, the material on a moving web. The multi-disk hole is processed in two steps, the first step comprising laser cutting of the interior hole of the disk and the second step comprising cutting the perimeter of the disk. The laser is programmed to cut the interior hole in individual parts, to jump downstream, and to cut the perimeter of the disk in a continuous cut. In one embodiment, the multi-hole disks are cut from an abrasive material.

The present disclosure is also directed to a system and method for processing one or more complex patterns on a continuous web, wherein the laser is directed along a path including cut and jump sections configured to increase the time in which a laser is active, or "on" in order to process or cut a plurality of complex shapes having one or more apertures therein while continuously moving the web.

DETAILED DESCRIPTION OF THE INVENTION

This disclosure is directed to a laser processing system and method for laser processing a roll of material on the fly without the need for tooling plates to support the material over a vacuum box. Efficiency is increased and the time required to process a substrate is reduced. A method is also disclosed for controlling a laser and galvo system using a camming program. The laser processing system also comprises a narrow slot vacuum mechanism for supporting the material being processed over a vacuum box, which is used to pull chads and other interior part features from the web during processing.

The system of this disclosure comprises a laser processing system adapted to cut both interior holes and perimeter cuts cleanly and over air while maintaining the web in a substantially flat manner. Multi-hole disks are cut and then singulated and transported from the laser processing system on a takeaway conveyor for robotic picking and stacking. Side by side, large area field of view galvo scanheads are used to cut the interior holes. The web is supported by rollers on either side of a narrow processing window. Nip rollers just downstream of the interior hole-processing window move the web through the processing area. The same side by side galvo scanheads are also used to cut the disk perimeters on the downstream side of the nip rollers.

A specially designed template is used to support the web in the perimeter cut area such that the singulated disks 10 are allowed to freely fall onto a takeaway conveyor where they are robotically picked and stacked into piles for packaging. The process is optimized using software to direct the galvo scanheads to equally share the cutting load between interior aperture cutting and perimeter cutting, even in embodiments wherein an odd number of rows of disks are produced across the web. An operator also does not need to design a complete cut path for the scanheads including jump paths between holes. The system of the present invention only requires the pattern of the interior holes and a perimeter cut along with a scanhead assignment for each disk 10 to process any plurality of disks 10.

Figure 1:
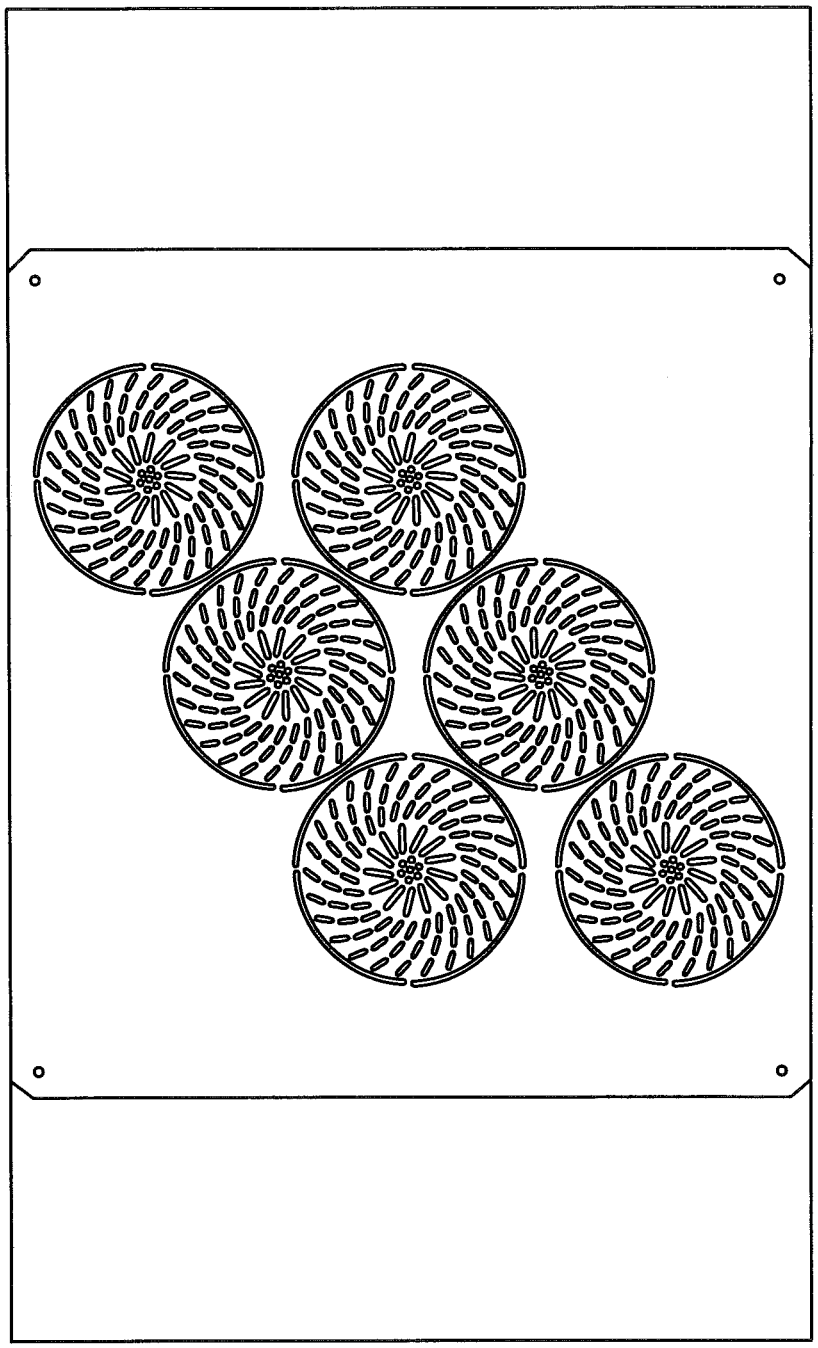
FIG. 1 is a top view of a tooling support of the prior art.
Figure 2:
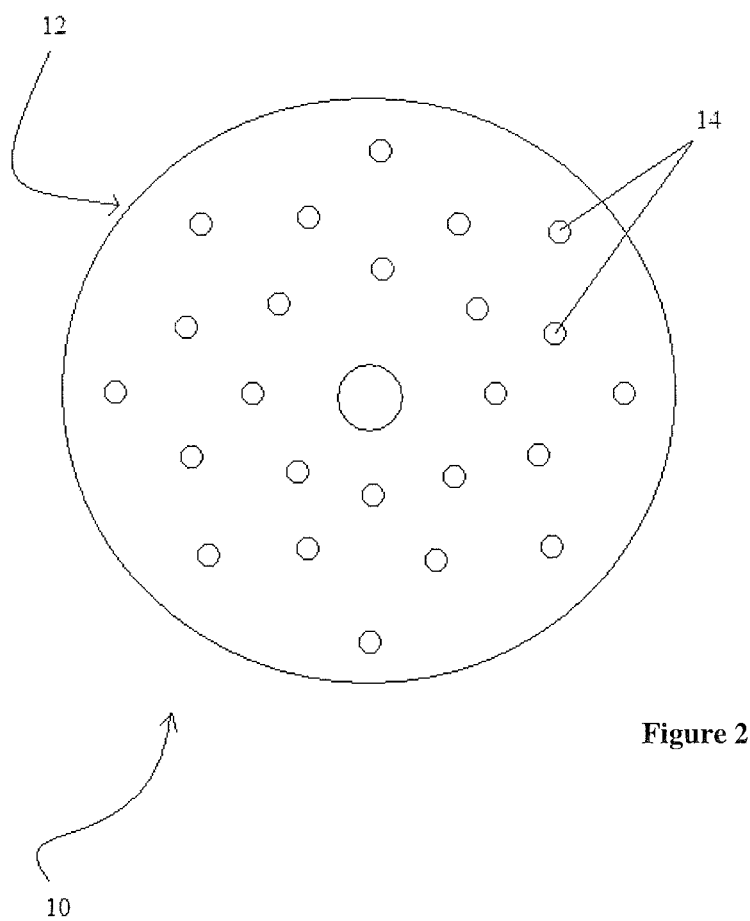
FIG. 2 is a top view of a multi-hole disk cut by the system and method of the present disclosure.
Figure 3:
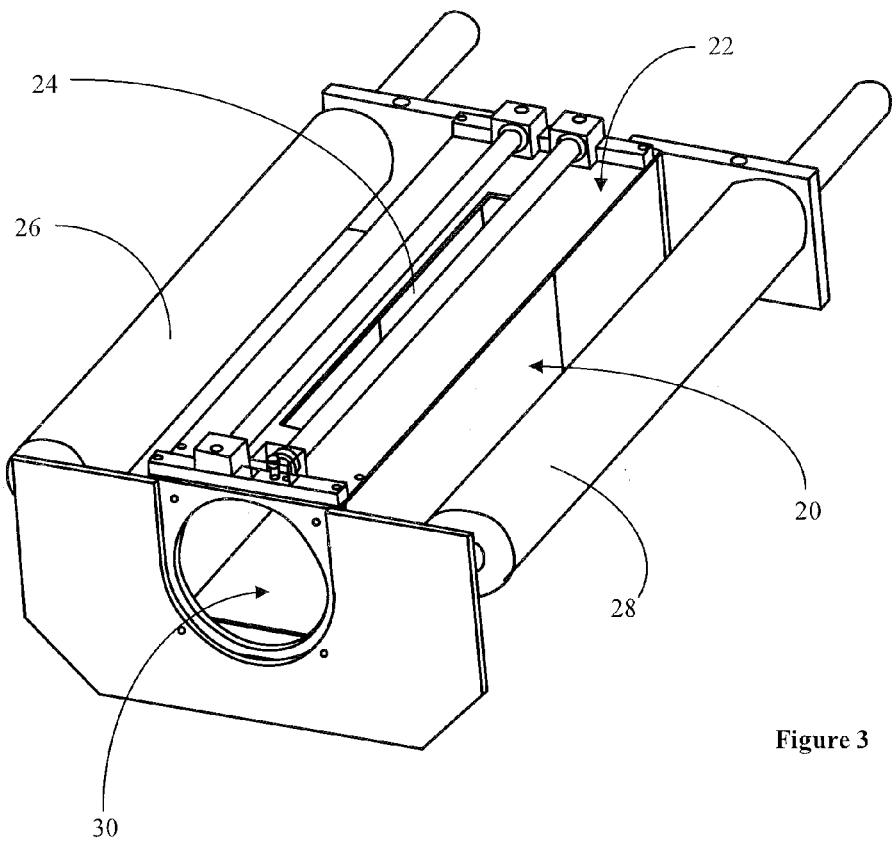
FIG. 3 is a perspective view of a mechanism for a workpiece support over a vacuum box.

As illustrated generally in FIG. 2, multi-hole disk 10 is cut from a continuous roll of material. Disk 10 comprises a plurality of interior holes 14 which are laser cut using a camming program and once the interior holes 14 have been cut, the perimeter 12 of the disk 10 is cut, removing the processed disk 10 from the roll of substrate. A disk 10 can include a single interior hole or a plurality of interior holes in any selected pattern and diameter, the pattern and diameter dependent on the end use of the disk or selected pattern as may be determined by end-use requirements.

This disclosure is further directed to a laser processing system and method that is used to process complex parts continuously on a moving web. As used throughout this disclosure, the terms "web" or "moving web" refer to a continuously moving substrate, the substrate moving in the web direction simultaneously with laser processing. The substrate may be a continuous roll of material or sheets of material, wherein the sheets are processed while continuously moving along the web, in the web direction. The terms "material" and "substrate" are used interchangeably throughout this disclosure and refer to the work piece for laser processing.

The materials processed according to embodiments disclosed herein can be any type of single layer, multi layer or extruded film, fabric or other material in which complex patterns are to be cut or shaped. In one embodiment, the material for processing is an abrasive material, a substrate having at least one surface that is textured or having abrasive material attached thereto or embedded therein or on. An example of an abrasive material is sandpaper, including any grit ranging from fine to coarse.

This disclosure further describes a laser processing system and method wherein a multi-hole disk is cut from a substrate wherein the multiple holes 14 are cut using a camming process. The laser then jumps downstream, while the web is moving, to cut a selected perimeter 12 around the holes 14 to form the disk 10. The completed multi-hole disk 10 is then easily separated from the substrate such that the disk is picked up and moved from the processing area and the remaining substrate is wound around a scrap roll for waste removal or recycling.

The present disclosure is directed to a method and system where the laser "on" time is increased and correspondingly, the laser "off" time is reduced, which results in an increased processing speed, reduced total processing time and thus an increase in overall efficiency by continuously moving the web during laser processing. To achieve processing of a single multi-hole disk 10 by the same laser beam, the laser beam "jumps" downstream to a position on the moving web to cut the perimeter of the disks after the pattern or plurality of interior holes have been cut. Each interior hole of the disk is cut using the camming program which processes the interior holes is nested parts. The perimeter of each disk is cut using a single continuous laser cut. Thus, the laser beam is programmed for camming upstream and laser cutting downstream and also programmed to jump between the upstream and downstream positions with respect to the web.

The system of the present invention cane be used to continuously laser process a substrate while the web is also continuously moving, which results in laser "on" time approaching approximately 90-95%. Based on testing and production data performed on abrasive material, using conventional step and repeat techniques produced 1187 parts per hour ("pph"). The system and method of the present disclosure which comprises the camming method and a narrow vacuum technique increases production rates by approximately 67% to 1981 pph with the system set at the same laser power and pen settings as the conventional step and repeat technique.

In further detail, the camming process allows laser processing of a substrate within a predetermined window 16. The center of the processing window is set by the user and the length of the processing window, the length being in the web direction, is determined by the length of the sections the processing parts are broken up into. To cut within the window 16, the camming program automatically adjusts pen speeds based on the web speed. If the web speed increases, the pen speed is increased by the program and conversely, if the web speed decreases, the pen speed is decreased.

As illustrated in FIG. 2, the laser processing system further comprises a vacuum box 20 positionable underneath the web and operable to remove debris from the processing area. The vacuum box 20 comprises a narrow slot or opening 24 to provide an adequate vacuum condition to pull chads and other interior aperture features from the web as the material is being processed. In one embodiment, the vacuum box 20 comprises two exhaust outlets 30, one exhaust outlet positioned at each end of the vacuum box 20. The dual exhaust outlets 30 are utilized when a web of wide width is used in order to provide an even airflow across the entire web.

Attached to the vacuum box 20 is a plate 22 approximately 0.125 inch thick. The plate is comprised of aluminum or a similar material and has an aperture or opening 24, which may be approximately two (2) inches long in the web direction 18 and in the width direction of the material being processed. The plate 22 helps to restrict airflow and increases the velocity of airflow in and through the processing window 16. Two separate rollers 26 and 28 are rotatably mounted on the plate 22 and positioned on either side of the processing window 16. The rollers are generally smaller in diameter than the rollers used for feeding the substrate through the laser system. For example, rollers 26 and 28 may be one (1) inch rollers. The size of the rollers may be, increased or decreased depending on various laser system specifications and requirements.

Figure 4:
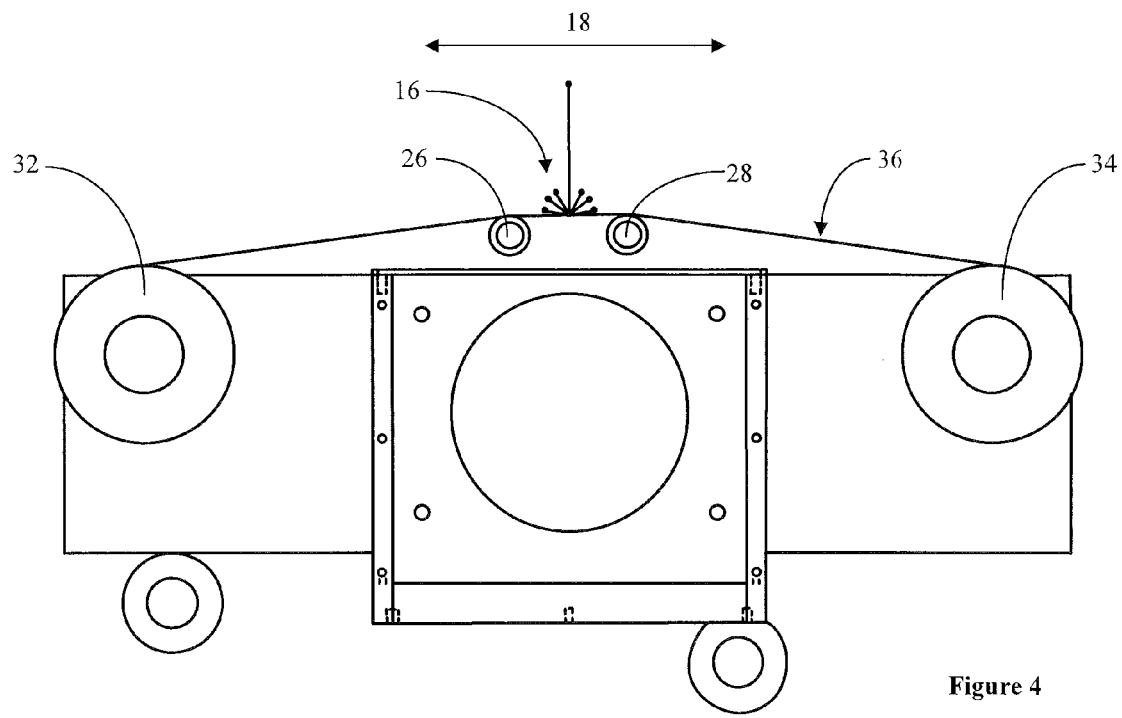
FIG. 4 is a side view of a processing window and web path illustrating substrate supports.

As illustrated in FIG. 4, the material 36 travels around the left most larger diameter roller 32, then passes over the two smaller rollers 26 and 28 that span the processing window 16 and the material 36 then returns back around the right most large diameter roller 34. Web tension is used to keep the material 36 substantially flat as the material 36 spans the gap between the rollers 26 and 28. The rollers 26 and 28 are adjustable so that depending on the application, a larger or smaller processing window 16 can be achieved.

Additional embodiments are contemplated wherein the material 36 can be supported across the web by varying the mounting locations of any or all of the rollers. For example, rollers 26 and 28 may be mounted within vacuum box 20 instead of on top of the vacuum box 20 to alter, for example, lessen or reduce an angle in which the material 36 travels over the vacuum box 20. Yet another embodiment may include eliminating the vacuum box 20 or rollers 26 and 28. The material 36 may slide across a substantially flat surface which is configured to allow for cutting the moving web with a kiss cut application to achieve the same results as the system and methods described previously in this disclosure. Yet another further embodiment may include any number of exhaust outlets 30 based on flow requirements and other design considerations including, but not limited to web size and substrate composition.

Figure 5:
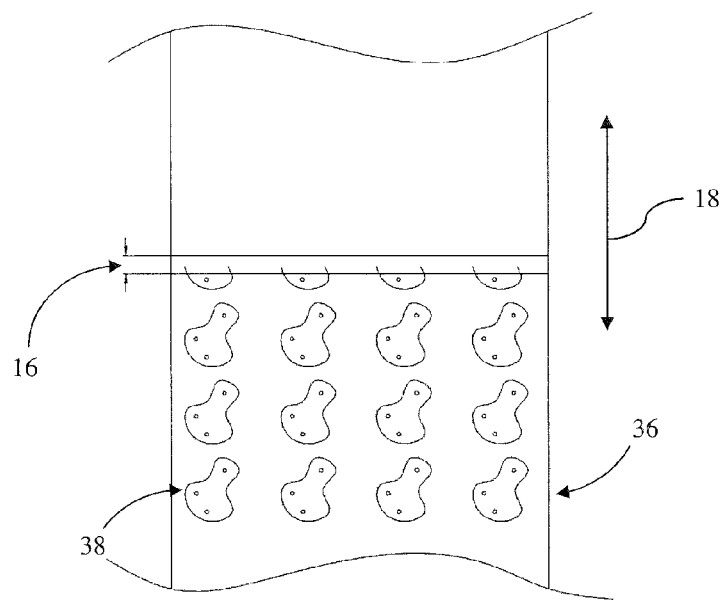
FIG. 5 is a top view of part processing paths on the fly with a small processing window.

As illustrated in FIGS. 5-10, the program for processing a substrate 36 with multi-hole disks 10 is broken down into parts or steps. Camming is used to process the interior holes 14 of the disk 10. Each interior hole 14 is processed in parts or steps, referred to as part nesting, when programmed for camming FIG. 4 illustrates the processing window 16 in which each nesting part 38 of the interior is processed. FIG. 5 illustrates the camming program and how the parts 38 are divided or broken up. FIGS. 6-9 illustrate the camming program progression as material travels through the processing window 16 and each part is processed.

The system and method of the present disclosure allows a part nesting to be processed within a processing window, which is set by the user. In one embodiment, as illustrated in FIG. 4, the part nesting will be processed with an intended processing window measuring approximately one (1) inch in the web direction 18 and twenty-four (24) inches across the web. The camming program file is created using a 2-Dimensional editor.

Figure 6:
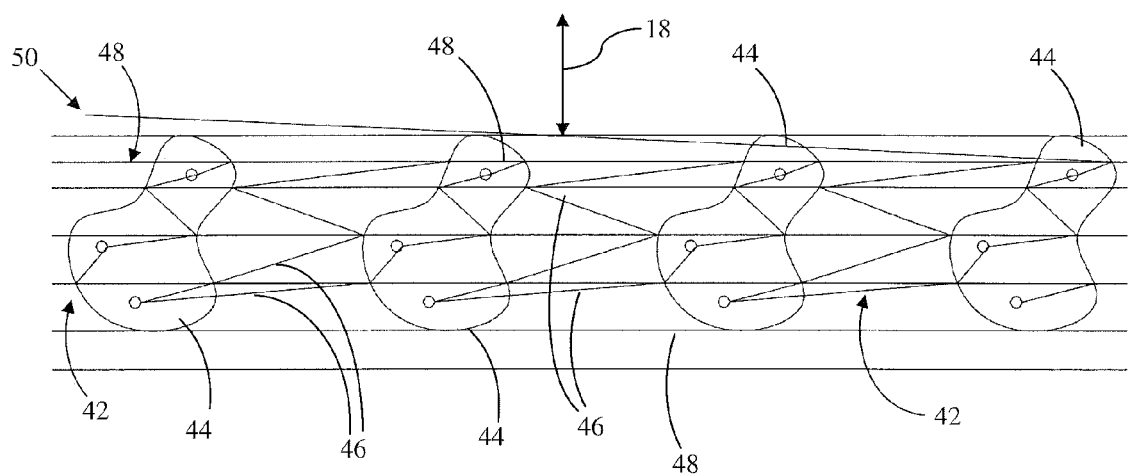
FIG. 6 illustrates the laser path according to a camming program of the present disclosure.
Figure 7:
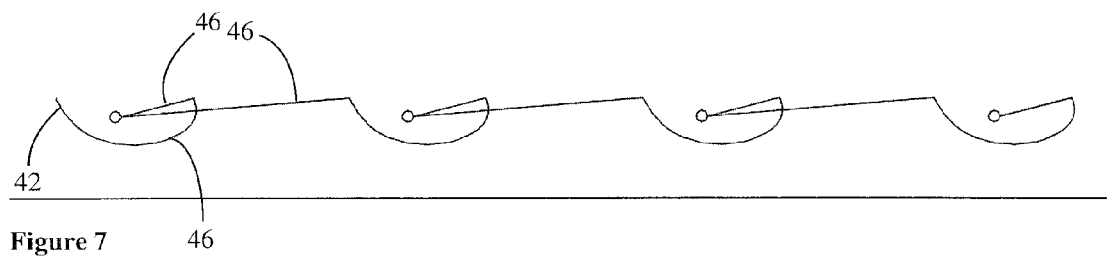
FIG. 7 illustrates a first cut section of the laser path according to the camming program.
Figure 8:
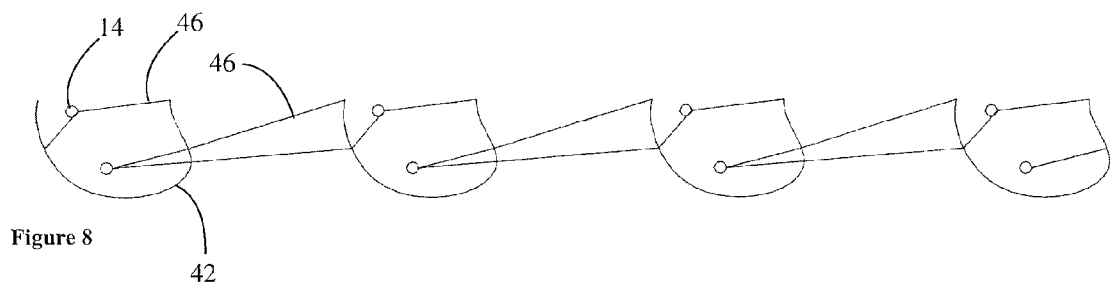
FIG. 8 illustrates a second cut section of the laser path according to the camming program.
Figure 9:
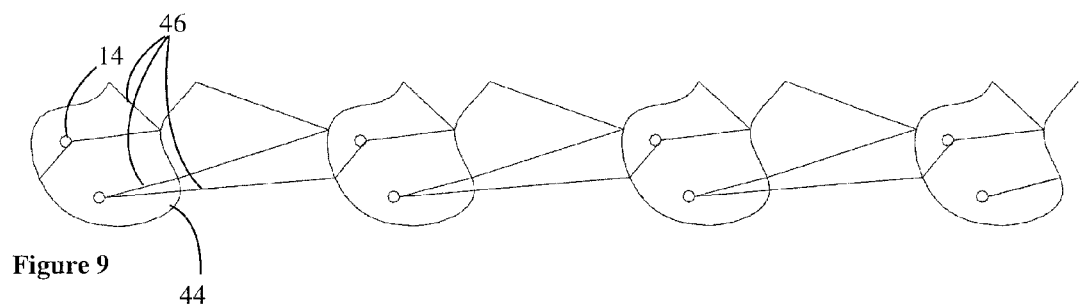
FIG. 9 illustrates a third cut section of the laser path according to the camming program.
Figure 10:
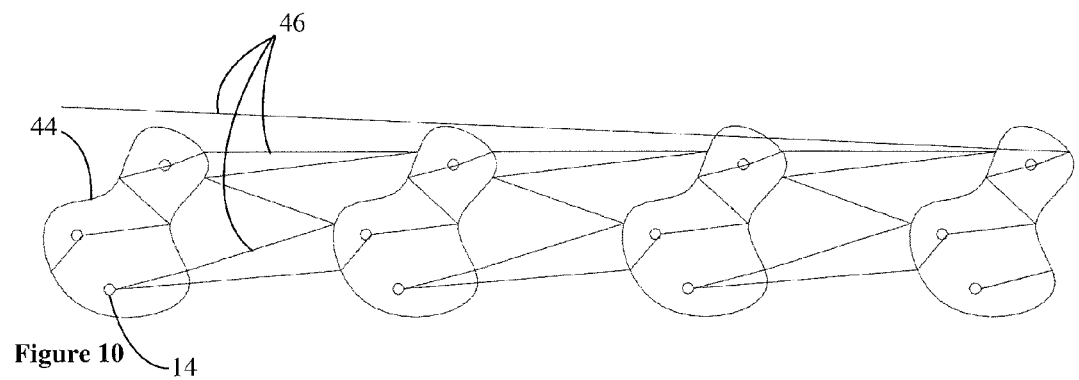
FIG. 10 illustrates a completed part nesting according to the camming program.

As illustrated in FIG. 6, cut program 40 begins, for example, at point 42 and ends, for example, at point 50. The cut program 40 processes the program continuously such that the program includes cuts along solid lines 44, which represent part features that are cut when processed. The generally diagonally connected and oriented lines 46 of program 40 are "jump" lines, or lines that connect cut sections and the generally horizontal lines 48 denote how the part nesting is divided or broken up. FIGS. 7-10 illustrate specific steps, or laser settings per movement along the program 40, in a sequential manner.

Each line 44, 46 and 48 has a pen setting attributed to it by, for example, an assigned color. The pen setting may be adjusted for cut lines, jump lines, or denoting lines. The pen setting refers to the laser power and pen speed. The pen settings for the cut lines 44 comprise a laser power and a pen speed set by the user based on material properties. The jump lines 46 are used to connect cut sections in the nesting and the laser power is set to zero watts (0 watts) and to a maximum pen speed in order to minimize laser off time. The user also sets the location of the processing window 16.

The camming program allows the interior holes 14 of the multi-hole disk 10 to be cut from the substrate 36 for processing while the substrate 36 is moving along the web and within a predetermined area, thus the need for separate tooling plates for different parts is completely eliminated. Also, when a sufficiently small processing window 16 is selected, the web tension is enough to maintain the web in a flat and smooth state, which eliminates the need to support the material processing near or directly under the cut surface.

Once the interior holes 14 have been cut, the same laser used to cut the interior aperture, opening or "hole" 14 then jumps downstream on the web and continues to process the perimeter 12 of the disk 10 with a single continuous laser cut of the perimeter area 12. The perimeter cut is a laser cut, the laser being directed by the corresponding galvo and not requiring the camming process or programming. Thus, the present invention is directed to a system wherein the same laser is used for cutting the interior holes and the perimeter of a multi-hole disk from an abrasive material.

Further embodiments of this disclosure include a multiple laser processing system wherein the multiple laser system processes a plurality of multi-hole disks simultaneously in a substrate on a moving web. A plurality of multi-disk holes are simultaneously cut in a substrate by using a laser processing system having a plurality of lasers, one laser processing both the interior and perimeter of the same multi-hole disk. In these systems, a plurality of lasers are independently directed by a plurality of corresponding galvo systems. The plurality of lasers may be adjacent to one another and aligned across a web, such that a field of view of each laser is aligned across the web, the fields of view correspondingly adjacent to one another. Each laser of the plurality of lasers thus processes a corresponding area of the substrate simultaneously to produce a plurality of multi-hole disk simultaneously and the lasers jumping downstream to cut the perimeters simultaneously. Each laser cuts both the interior and perimeter of the disk within its field of view.

Once the disk(s) has/have been cut and removed from the substrate, the laser or lasers is/are immediately repositioned upstream to begin camming the interior holes of a subsequent disk on the continuously moving web.

Although the present invention has been described with reference to preferred embodiments, workers skilled in the art will recognize that changes may be made in form and detail without departing from the spirit and scope of the invention.

What is claimed:

1. A method for producing a complex pattern in a target area on a workpiece using a laser beam, the method comprising:
   directing a focal point of the laser beam on to the moving workpiece and along a first path wherein the first path is for removing a plurality of first areas from the target area of the workpiece;
   moving the focal point of the laser beam downstream concurrently with the moving workpiece while removing the plurality of first areas from the target area;
   repositioning the focal point of the laser beam further downstream than the target area;
   subsequently directing the laser beam along a second path on the moving workpiece, the second path forming a perimeter of the target area and the target area thus encompassing the plurality of first areas removed from the workpiece; and
   separating the target area from the workpiece.

2. The method of claim 1 and further comprising the step of dividing the complex pattern into a plurality of laser cut paths and directing the laser beam along the plurality of cut paths in a predetermined order to remove the plurality of areas from the target area.

3. The method of claim 2 and further comprising the step of setting the laser power to zero and a rate of displacement of the focal point of the laser beam to a maximum speed when moving the laser beam between cut paths to remove the plurality of areas from the target area.

4. The method of claim 1 and further comprising directing a plurality of focal points of a plurality of laser beams onto a plurality of target areas on the workpiece to remove a plurality of areas from the plurality of target areas on the workpiece.

5. The method of claim 4 and further comprising repositioning the plurality of laser beam focal points simultaneously further downstream than the target areas before forming the perimeters.

6. The method of claim 1 and further comprising continuously processing the workpiece having an abrasive surface.

7. The method of claim 1 and further comprising removing the plurality of areas from the target area while moving the workpiece continuously through a processing window.

8. A method for laser processing complex pattern on a continuously moving substrate with a continuous cut plan comprising:
   directing a laser beam continuously from a first, starting point to a second, ending point, on the moving substrate to remove a plurality of areas from the substrate;
   directing the laser beam continuously along a path from the first point to the second point on the moving substrate, the path forming a perimeter of one or more areas of the plurality of areas for removal for one or more areas from the substrate;
   dividing the path from the first point to the second point into one or more segments, the one or more segments comprising cut segments and jump segments wherein the laser is configured to cut the substrate along each cut segment and to pass over the substrate along each jump segment and to alternate between cut and jump segments as required by the path;

altering laser power and speed concurrently as the laser continuously moves along the path as the laser moves along cut and jump segments; and separating the cut areas from the substrate.

9. The method of claim 8 wherein the laser power is set to a minimum power and the laser speed is set to a maximum speed along the jump segments.

10. The method of claim 8 wherein the path extends a total length greater than the width of the substrate and the path travels in a first and second direction across the width of the substrate while also moving along the direction of travel of the substrate to remove a plurality of discrete areas across the substrate.

11. The method of claim 8 and further comprising directing a plurality of laser beams onto a plurality of areas on the moving substrate to remove the plurality of areas from a moving web.

12. The method of claim 11 and further comprising repositioning the plurality of laser beams simultaneously further downstream than the plurality of areas before forming a perimeter around the substrate.

13. A method for producing a complex pattern on a workpiece using a laser beam, the method comprising:

directing the laser beam on to the moving workpiece to remove a plurality of areas from the workpiece;

moving the laser beam downstream with the moving workpiece while removing the plurality of areas from the workpiece;

directing the laser beam along a path on the moving workpiece, the path forming a perimeter encompassing one or more of the plurality of areas;

changing a power setting and a speed setting of the laser as the laser moves between the plurality of areas to alternate between laser beam cutting segments and laser beam focal point jumping segments; and separating the areas from a moving workpiece.

14. The method of claim 13 and further comprising the step of changing the laser power to zero and the laser speed to a maximum speed when moving the laser beam between the plurality of areas.

15. The method of claim 13 and further comprising directing a plurality of laser beams onto a plurality of areas on the moving workpiece to remove the plurality of areas from the moving workpiece.

16. The method of claim 13 and further comprising repositioning the plurality of laser beams simultaneously further downstream than the plurality of areas before forming a perimeter around the workpiece.

* * * * *